United States Patent
Tanouchi et al.

(10) Patent No.: US 10,122,316 B2
(45) Date of Patent: Nov. 6, 2018

(54) MOTOR DRIVE APPARATUS HAVING FUNCTION FOR DETERMINING ABNORMALITY OF MAIN POWER SUPPLY VOLTAGE

(71) Applicant: FANUC CORPORATION, Yamanashi (JP)

(72) Inventors: Hironao Tanouchi, Yamanashi (JP); Yasuyuki Matsumoto, Yamanashi (JP); Naoki Masuda, Yamanashi (JP); Kiichi Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/345,629

(22) Filed: Nov. 8, 2016

(65) Prior Publication Data

US 2017/0141715 A1     May 18, 2017

(30) Foreign Application Priority Data

Nov. 12, 2015 (JP) ................. 2015-222107

(51) Int. Cl.
 *H02H 3/20* (2006.01)
 *H02P 29/032* (2016.01)
 (Continued)

(52) U.S. Cl.
 CPC ............. *H02P 29/032* (2016.02); *H02H 7/09* (2013.01); *H02H 11/006* (2013.01)

(58) Field of Classification Search
 CPC ........ H02H 3/207; H02H 1/0015; H02H 3/00; H02H 3/38; H02H 3/52; H02H 7/0833;
 (Continued)

(56) References Cited

U.S. PATENT DOCUMENTS

| 4,682,263 A | * | 7/1987 | Gradnitzer | ............... H02H 3/52 361/23 |
| 4,717,984 A | * | 1/1988 | Henry | ................... H02H 6/005 307/66 |

(Continued)

FOREIGN PATENT DOCUMENTS

| JP | 60128515 A | 7/1985 |
| JP | 4165921 A | 6/1992 |

(Continued)

OTHER PUBLICATIONS

English Abstract for Japanese Publication No. 2010-226893 A, published Oct. 7, 2010, 1pg.

(Continued)

*Primary Examiner* — Rina Duda
(74) *Attorney, Agent, or Firm* — Fredrickson & Byron, P.A.

(57) ABSTRACT

A motor drive apparatus in which a main power supply used for motor drive is supplied via a magnetic contactor includes: a monitoring unit that monitors a main power supply voltage at an AC power supply input side of the magnetic contactor in a state in which contacts of the magnetic contactor are opened; a determination unit that determines whether the main power supply voltage monitored by the monitoring unit is normal; and a magnetic contactor control unit that outputs a command that controls opening and closing of contacts of the magnetic contactor, wherein when it is determined by the determination unit that the main power supply voltage is abnormal, the magnetic contactor control unit maintains an output of an open command such that the contacts of the magnetic contactor are opened.

5 Claims, 4 Drawing Sheets

(51) Int. Cl.
*H02H 7/09* (2006.01)
*H02H 11/00* (2006.01)

(58) Field of Classification Search
CPC ...... H02H 1/0061; H02H 3/027; H02H 3/042; H02H 3/20; H02H 3/24; H02H 3/247; H02H 3/253; H02H 3/46; H02H 6/005; H02H 7/09
USPC .................................................. 318/727, 638
See application file for complete search history.

(56) References Cited

U.S. PATENT DOCUMENTS

| | | | | | |
|---|---|---|---|---|---|
| 5,179,842 | A | * | 1/1993 | Kanazawa | F25B 49/025 318/778 |
| 5,388,022 | A | | 2/1995 | Ahuja | |
| 5,579,197 | A | * | 11/1996 | Mengelt | H02J 9/062 307/66 |
| 5,689,411 | A | * | 11/1997 | Chabraya | H02M 5/2573 219/507 |
| 5,705,904 | A | * | 1/1998 | Kuriyama | H02M 1/32 318/400.21 |
| 5,751,132 | A | * | 5/1998 | Horvath | G01R 31/343 318/490 |
| 5,784,268 | A | * | 7/1998 | Steffek | H02M 7/48 307/46 |
| 5,973,489 | A | * | 10/1999 | Dourlain | H02M 1/10 323/299 |
| 6,515,379 | B1 | * | 2/2003 | Nojima | H02M 1/10 307/130 |
| 7,262,945 | B2 | * | 8/2007 | Galang | H02H 3/207 361/90 |
| 7,460,346 | B2 | * | 12/2008 | Deshpande | H02H 1/0015 361/62 |
| 7,633,732 | B2 | * | 12/2009 | Galang | H02H 3/207 361/90 |
| 8,248,745 | B2 | * | 8/2012 | Galang | H02H 3/207 361/42 |
| 2004/0057179 | A1 | * | 3/2004 | Galang | H02H 3/207 361/90 |
| 2005/0018371 | A1 | * | 1/2005 | Mladenik | H02H 3/00 361/78 |
| 2005/0105229 | A1 | * | 5/2005 | Deng | H02J 9/062 361/90 |
| 2005/0195545 | A1 | * | 9/2005 | Mladenik | H02H 3/00 361/93.1 |
| 2006/0215335 | A1 | * | 9/2006 | Deshpande | H02H 1/0015 361/42 |
| 2007/0258177 | A1 | * | 11/2007 | Galang | H02H 3/207 361/90 |
| 2010/0006378 | A1 | * | 1/2010 | Blasko | B66B 1/30 187/290 |
| 2010/0008004 | A1 | * | 1/2010 | Galang | H02H 3/207 361/59 |
| 2010/0264743 | A1 | * | 10/2010 | Jung | H02J 9/061 307/80 |
| 2013/0033109 | A1 | * | 2/2013 | Schultz | H02J 9/062 307/64 |
| 2013/0242445 | A1 | * | 9/2013 | Dani | H02H 3/207 361/86 |
| 2014/0063860 | A1 | * | 3/2014 | Suzuki | H02M 1/36 363/17 |
| 2014/0292232 | A1 | * | 10/2014 | Tsutsumi | H02P 29/025 318/85 |
| 2014/0320092 | A1 | * | 10/2014 | Radan | B63H 23/24 322/19 |
| 2014/0340804 | A1 | * | 11/2014 | Ward | H01H 51/01 361/115 |
| 2015/0001962 | A1 | * | 1/2015 | Higashiyama | F24F 11/02 307/113 |
| 2015/0084563 | A1 | * | 3/2015 | Lucas | H02P 6/17 318/400.29 |
| 2015/0091485 | A1 | * | 4/2015 | Lemberg | G05B 19/0425 318/453 |
| 2016/0065082 | A1 | * | 3/2016 | Suzuki | H02M 1/36 363/17 |
| 2016/0072422 | A1 | * | 3/2016 | Kuroki | H02M 1/32 318/519 |
| 2016/0131387 | A1 | * | 5/2016 | Sawada | H02H 3/253 62/158 |

FOREIGN PATENT DOCUMENTS

| | | |
|---|---|---|
| JP | 4355627 A | 12/1992 |
| JP | 5342977 A | 12/1993 |
| JP | 10257672 A | 9/1998 |
| JP | 200361384 A | 2/2003 |
| JP | 200714691 A | 1/2007 |
| JP | 2010226893 A | 10/2010 |

OTHER PUBLICATIONS

English Abstract for Japanese Publication No. 2003-061384 A, published Feb. 28, 2003, 1pg.
English Abstract and Machine Translation for Japanese Publication No. 2007-014691 A, published Jan. 25, 2007, 10 pgs.
English Abstract for Japanese Publication No. 10-257672 A, published Sep. 25, 1998, 1 pg.
English Abstract and Machine Translation for Japanese Publication No. 05-342977 A, published Dec. 24, 1993, 10 pgs.
English Abstract and Machine Translation for Japanese Publication No. 04-355627 A, published Dec. 9, 1992, 10 pgs.
English Abstract for Japanese Publication No. 04-165921 A, published Jun. 11, 1992, 1 pg.
English Abstract for Japanese Publication No. 60-128515 A, published Jul. 9, 1985, 1 pg.

* cited by examiner

MOTOR DRIVE APPARATUS HAVING FUNCTION FOR DETERMINING ABNORMALITY OF MAIN POWER SUPPLY VOLTAGE

BACKGROUND OF THE INVENTION

1. Field of the Invention

The present invention relates to a motor drive apparatus in which a main power supply used for motor drive is supplied via a magnetic contactor.

2. Description of the Related Art

In a motor drive apparatus for driving a motor in machine tools, a forging press machine, an injection molding machine, an industrial machine, or various types of robots, a main power supply used for driving the motor is supplied from an AC power supply side via a magnetic contactor. When driving the motor, the motor drive apparatus is powered on by contacts of the magnetic contactor being closed (on). In this manner, an AC power serving as main power supply is supplied to the motor drive apparatus from the AC power supply side via the magnetic contactor, and the motor drive apparatus converts the AC power to power suitable for driving the motor and supplies the power to the motor.

Generally, the magnitude of the main power supply voltage (e.g., the rated voltage) which is allowed for the motor drive apparatus is set beforehand depending on various factors such as the type and use of the motor to be driven or the performance and structure of the motor drive apparatus. However, when an inappropriate AC power supply in excess of the rating is erroneously connected to the motor drive apparatus, a voltage of a value exceeding the allowable main power supply voltage is applied to the motor drive apparatus, thus sometimes causing a damage to the components constituting the motor drive apparatus and/or the motor per se.

For example, as described in Japanese Unexamined Patent Publication (Kokai) No. 2010-226893, there is a power supply device configured to prevent a damage to or deterioration of a component or load due to application of an overvoltage even when a wrong power supply is connected, wherein while a predetermined time is counted from when an opening and closing circuit is closed, a charged voltage is monitored across a smoothing capacitor for smoothing a DC voltage rectified from an AC power supply by a rectifier circuit, and when the charged voltage exceeds a predetermined voltage, the opening and closing circuit is opened.

Further, for example, as described in Japanese Unexamined Patent Publication (Kokai) No. 2003-061384, there is a motor drive apparatus in which switch control means for controlling the operation of a switch element of an inverter in the motor drive apparatus is equipped with an overvoltage protection function, and it is configured such that when a voltage in excess of the rating is applied to the switch element, the protection function works to shut off a gate voltage, thereby preventing a damage to the switch element.

As described above, when an AC power supply which is excessive for the rating of the motor drive apparatus is erroneously connected, a voltage having a value which is greater than the allowable main power supply voltage is applied to the motor drive apparatus, thus sometimes causing a damage to the components of the motor drive apparatus and/or the motor per se.

SUMMARY OF INVENTION

In view of the problems as described above, it is an object of the invention to provide a motor drive apparatus capable of positively preventing a damage to internal components even when a wrong power supply is connected.

In order to achieve the above-described object, the motor drive apparatus in which a main power supply used for motor drive is supplied via a magnetic contactor includes: a monitoring unit that monitors a main power supply voltage at an AC power supply input side of the magnetic contactor in a state in which contacts of the magnetic contactor are opened; a determination unit that determines whether the main power supply voltage monitored by the monitoring unit is normal; and a magnetic contactor control unit that outputs a command that controls opening and closing of contacts of the magnetic contactor, wherein when it is determined by the determination unit that the main power supply voltage is abnormal, the magnetic contactor control unit maintains an output of an open command that controls such that the contacts of the magnetic contactor are opened.

The determination unit may be configured to determine that the main power supply voltage is abnormal when the main power supply voltage is higher than a first reference voltage set beforehand.

Further, the determination unit may be configured to determine that the main power supply voltage is abnormal when the main power supply voltage is lower than a second reference voltage set beforehand at a value which is lower than the first reference voltage.

Further, when it is determined by the determination unit that the main power supply voltage is abnormal, the magnetic contactor control unit may control to maintain opening of contacts of a magnetic contactor connected to other motor drive apparatus which is different from the motor drive apparatus including the magnetic contactor control unit.

Further, the motor drive apparatus may include an output unit that outputs an open command outputted from the magnetic contactor control unit to the magnetic contactor connected to the other motor drive apparatus, and the magnetic contactor connected to the other motor drive apparatus may be configured such that the contacts thereof are opened when the open command is received from the output unit.

BRIEF DESCRIPTION OF THE DRAWINGS

The invention will be understood more clearly by referring to the following accompanying drawings.

DETAILED DESCRIPTION

A motor drive apparatus having a function for determining an abnormality of a main power supply voltage will be described below with reference to the drawings. It should be understood that the present invention is not limited to the drawings or embodiments described below.

Figure 1:
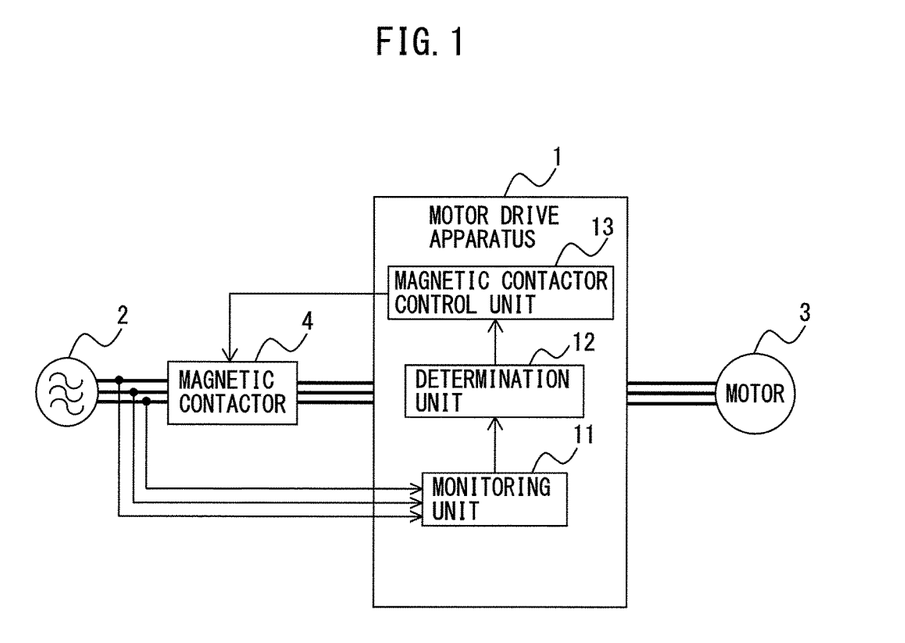
FIG. 1 is a block diagram illustrating a motor drive apparatus according to an embodiment.

FIG. 1 is a block diagram illustrating a motor drive apparatus according to an embodiment. Let it be assumed hereinafter that components assigned identical reference numerals in different figures refer to those having identical functions.

The motor drive apparatus 1 according to the embodiment is such that a main power supply used to drive a motor 3 is supplied from an AC power supply 2 side via a magnetic contactor 4. When driving the motor 3, the contacts of the magnetic contactor 4 are closed (ON) so that the motor drive apparatus 1 is powered on, and consequently, AC power as the main power supply is supplied from the AC power supply 2 side via the magnetic contactor 4 to the motor drive apparatus 1 which in turn converts the AC power to power suitable for driving the motor 3 and supplies it to the motor 3. Incidentally, the type and structure of the magnetic contactor 4 do not particularly limit the present invention.

The type and number of the motor 3 to be driven by the motor drive apparatus 1 do not limit the present invention, and the motor may be an AC motor such as induction motor and synchronous motor or a DC motor. In a case where the motor 3 is an AC motor, the motor drive apparatus 1 once converts AC power inputted from the AC power supply 2 side to DC power by a rectifier (not illustrated) and then further converts the DC power to AC power by an inverter (not illustrated) and supplies the AC power to the motor 3. In a case where the motor 3 is a DC motor, the motor drive apparatus 1 converts AC power inputted from the AC power supply 2 side to DC power by a rectifier (not illustrated) and supplies the DC power to the motor 3. In either case, the motor drive apparatus 1 is supplied with the AC main power supply via the magnetic contactor 4. In FIG. 1, there is omitted illustration of a main circuit system and a control system thereof, which take part directly in drive control of the motor 3. The motor 3 is used as a drive source for a feed shaft or spindle shaft of a machine tool, an industrial machine, an arm of an industrial robot, or the like.

Further, in the illustrated example, the number of phases of the AC power supply 2 is three, but the number of phases does not particularly limit the present invention, and the AC power supply may, for example, be a single-phase or other multi-phase AC power supply instead of being a three-phase one. Examples of the AC power supply 2 include a three-phase 400V AC power supply, a three-phase 200V AC power supply, a three-phase 600V AC power supply, a single-phase 100V AC power supply or the like. Further, a transformer may be provided between the motor drive apparatus 1 and the power supply 2, and, in such a case, a voltage stepped up or down by the transformer is applied to the motor drive apparatus 1.

The motor drive apparatus 1 according to the embodiment includes a monitoring unit 11, a determination unit 12, and a magnetic contactor control unit 13.

The magnetic contactor control unit 13 outputs, as a command for controlling opening/closing (on/off) of contacts of the magnetic contactor 4, an open command (off command) that commands the contacts of the magnetic contactor 4 to be opened and a close command (on command) that commands the contacts of the magnetic contactor 4 to be closed.

The monitoring unit 11 monitors and detects the main power supply voltage at the side where the AC power supply 2 of the magnetic contactor 4 is inputted, in a state in which the contacts of the magnetic contactor 4 are opened. The main power supply monitored by the monitoring unit 11 is stepped down to a value which can be processed by the determination unit 12 at the next stage, and thereafter inputted to the determination unit 12. General, while the operation for the operator to connect electrically the motor drive apparatus 1 and the AC power supply 2 is performed in a state in which the magnetic contactor 4 is off (i.e., in a state in which the contacts are opened), the monitoring unit 11 serves to monitor the main power supply voltage at the side where the AC power supply 2 of the then magnetic contactor 4 is inputted.

The determination unit 12 determines whether the main power supply voltage monitored by the monitoring unit 11 is normal. The result of the determination by the determination unit 12 is sent to the magnetic contactor control unit 13. The determination unit 12 is, for example, constituted by an LSI (large-scale integrated circuit). More specifically, when the main power supply voltage monitored by the monitoring unit 11 is higher than a first reference voltage $V_{ref1}$ which is set beforehand, the determination unit 12 determines that the main power supply voltage is abnormal. The first reference voltage $V_{ref1}$ is set, by way of example, to be 290 V, which is an addition of a margin of approximately 20% to 240 V, when the main power supply voltage of the motor drive apparatus 1 (i.e., the AC voltage inputted to the motor drive apparatus 1) is three-phase AC 200 V to 240 V. For example, when the AC power supply 2 of three-phase AC 400 V is connected by mistake to the motor drive apparatus 1 in which the first reference voltage $V_{ref1}$ is set to be 290 V, since the main power supply voltage 400 V monitored by the monitoring unit 11 is higher than 290 V which is the first reference voltage $V_{ref1}$, the determination unit 12 determines that the main power supply voltage is abnormal.

When it is determined by the determination unit 12 that the main power supply voltage is abnormal, the magnetic contactor control unit 13 maintains an output of the open command (off command) that controls the contacts of the magnetic contactor 4 to be opened (off). In other words, when it is determined that the main power supply voltage is abnormal, the contacts of the magnetic contactor 4 are not allowed to be closed (on), so that the magnetic contactor 4 maintains the opened state (off state) and thus the main power supply voltage is not applied from the AC power supply 2 to the motor drive apparatus 1. In contrast, when it is determined by the determination unit 12 that the main power supply voltage is normal, the magnetic contactor control unit 13 outputs a close command (on command) that controls such that the contacts of the magnetic contactor 4 are closed (on). In other words, when it is determined that the main power supply voltage is normal, the contacts of the magnetic contactor 4 are closed, so that the magnetic contactor 4 transits to a closed state (on state) and thus the main power supply voltage is applied from the AC power supply 2 to the motor drive apparatus 1.

For example, when the AC power supply 2 of three-phase AC 400 V is connected by mistake to the motor drive apparatus 1 in which the first reference voltage $V_{ref1}$ is set to be 290 V, since the main power supply voltage 440 V monitored by the monitoring unit 11 is higher than 290 V which is the first reference voltage $V_{ref1}$, the determination unit 12 determines that the main power supply voltage is abnormal, and in response thereto, the magnetic contactor control unit 13 keeps outputting the open command that controls such that the contacts of the magnetic contactor 4 are opened. Consequently, the magnetic contactor 4 remains off, so that the main power supply voltage 400 V is prevented from being applied from the AC power supply 2 to the motor drive apparatus 1, thereby making it possible to prevent a damage to the components of the motor drive apparatus 1 and/or the motor per se.

Figure 2:
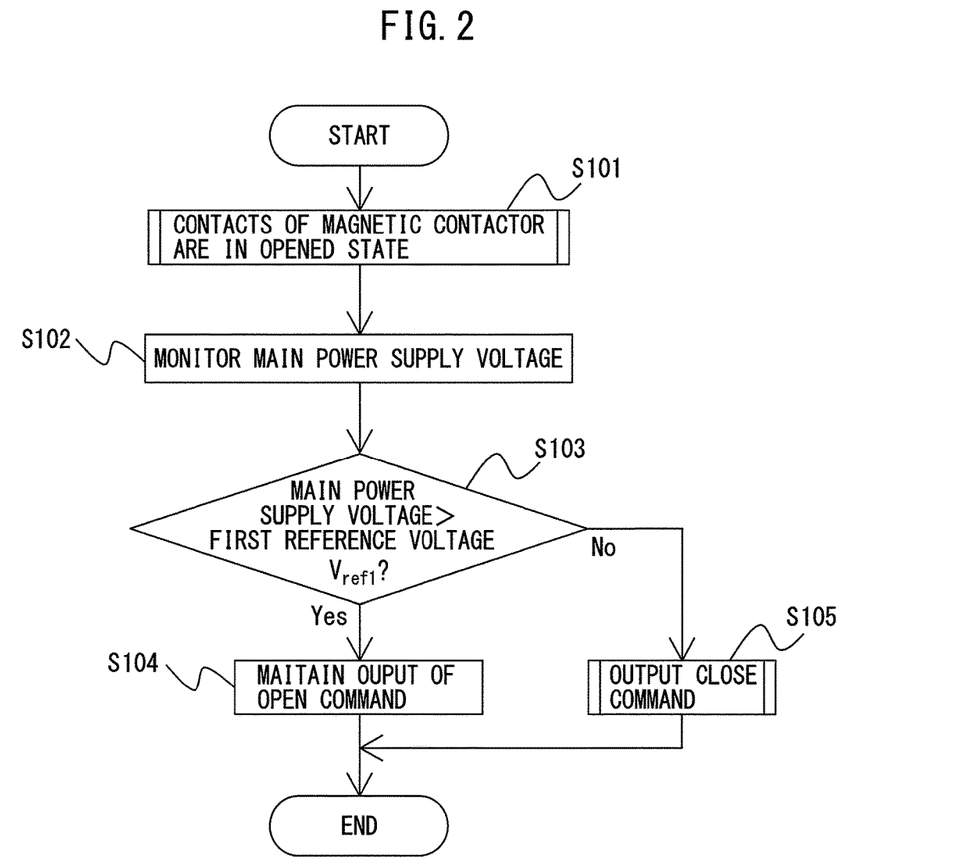
FIG. 2 is a flow chart illustrating an operation flow of abnormality determination process and magnetic contactor opening and closing control in the motor drive apparatus illustrated in FIG. 1.

FIG. 2 is a flow chart illustrating an operation flow of abnormal determination process and magnetic contactor opening and closing control in the motor drive apparatus illustrated in FIG. 1.

First, in an initial state, let it be assumed that the magnetic contactor control unit 13 continues outputting the open command (off command) that commands the contacts of the magnetic contactor 4 to be opened, so that a state exists in which the contacts of the magnetic contactor 4 are opened, i.e., the magnetic contactor 4 is in an opened state (off state) (step S101).

At step S102, the monitoring unit 11 monitors and detects the main power supply voltage at a side of the magnetic contactor 4 where the AC power supply 2 is inputted, in a state in which the contacts of the magnetic contactor 4 are opened. The main power supply voltage monitored by the monitoring unit 11 is stepped down to a value which can be processed by the determination unit 12 at the next stage, and thereafter inputted to the determination unit 12.

At step S103, the determination unit 12 determines whether the main power supply voltage monitored by the monitoring unit 11 is higher than the first reference voltage $V_{ref1}$, thereby determining whether the main power supply voltage is normal. When it is determined by the determination unit 12 that the main power supply voltage is higher than the first reference voltage $V_{ref1}$, the main power supply voltage is abnormal, and therefore the process proceeds to step S104. In contrast, when it is determined by the determination unit 12 that the main power supply voltage is lower than the first reference voltage $V_{ref1}$, the main power supply voltage is normal, and therefore the process proceeds to step S105.

At step S104, the magnetic contactor control unit 13 maintains an output of the open command (off command) that controls such that the contacts of the magnetic contactor 4 are opened (off). In this manner, the contacts of the magnetic contactor 4 are not allowed to be closed (on), so that the magnetic contactor 4 maintains the opened state (off state) and thus the main power supply voltage is prevented from being applied from the AC power supply 2 to the motor drive apparatus 1. Consequently, it is possible to prevent a damage to the components constituting the motor drive apparatus 1 and/or the motor per se.

At step S105, the magnetic contactor control unit 13 outputs the close command (on command) that controls such that the contacts of the magnetic contactor 4 are closed (on). In this manner, the contacts of the magnetic contactor 4 are closed, so that the magnetic contactor 4 transits to closed state (on state), and thus the main power supply voltage is applied from the AC power supply 2 to the motor drive apparatus 1.

As described above, in the present embodiment, when the AC power supply 2, which is excessive with respect to the rating of the motor drive apparatus 1, is connected by mistake, the determination unit 12 determines that the main power supply voltage is abnormal, so that the magnetic contactor control unit 13 maintains the output of the open command (off command) that controls such that the contacts of the magnetic contactor 4 are opened (off). In this manner, the magnetic contactor 4 maintains the opened state (off state), and thus the main power supply voltage is prevented from being applied from the AC power supply 2 to the motor drive apparatus 1. Consequently, it is possible to prevent a damage to the components of the motor drive apparatus 1 and/or the motor per se.

Figure 3:
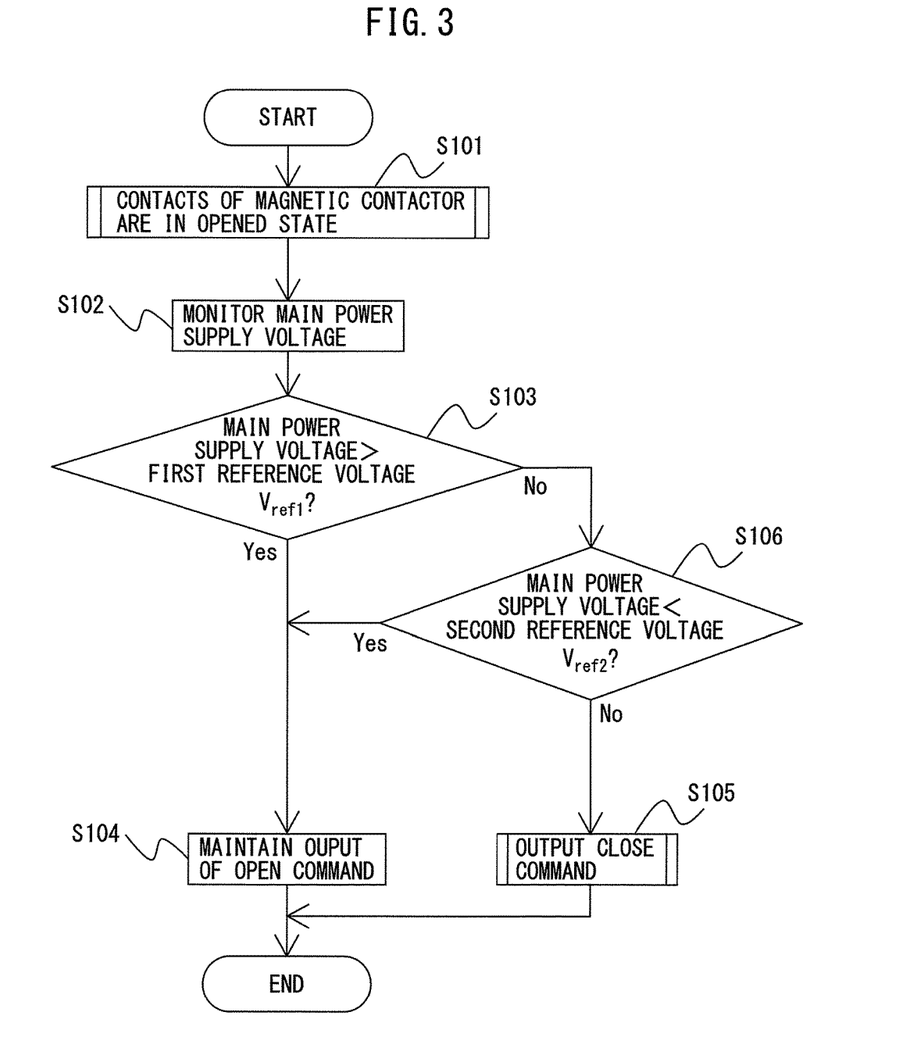
FIG. 3 is a flow chart illustrating a modified example of the operation flow of abnormality determination process and magnetic contactor opening and closing control illustrated in FIG. 2.

In a modified example of the above-described embodiment, the determination unit 12 may be configured to determine whether the main power supply voltage monitored by the monitoring unit 11 is normal, not only based on a determination criterion of whether the main power supply voltage is higher than the first reference voltage $V_{ref1}$ but also based on a determination criterion of whether the main power supply voltage is lower than "a second reference voltage set beforehand at a value which is lower than the first reference voltage". FIG. 3 is a flow chart illustrating a modified example of the operation flow of the abnormal determination process and magnetic contactor opening and closing control illustrated in FIG. 2.

At step S101 of FIG. 3, first, in an initial state, let it be assumed that the magnetic contactor control unit 13 outputs an open command (off command) that commands the contacts of the magnetic contactor 4 to be opened, so that a state exists in which the contacts of the magnetic contactor 4 are opened, i.e., the magnetic contactor 4 is in the opened state (off state).

At step S102, the monitoring unit 11 monitors and detects the main power supply voltage at a side of the magnetic contactor 4 where the AC power supply 2 is inputted, in a state in which the contacts of the magnetic contactor 4 are opened. The main power supply voltage monitored by the monitoring unit 11 is stepped down to a value which can be processed by the determination unit 12 at the next stage, and thereafter inputted to the determination unit 12.

At step S103, the determination unit 12 determines whether the main power supply voltage monitored by the monitoring unit 11 is higher than the first reference voltage $V_{ref1}$, thereby determining whether the main power supply voltage is normal. When it is determined by the determination unit 12 that the main power supply voltage is higher than the first reference voltage $V_{ref1}$, the main power supply voltage is abnormal, and the process proceeds to step S104. In contrast, when it is determined by the determination unit 12 that the main power supply voltage is lower than the first reference voltage $V_{ref1}$, the process proceeds to step S106.

At step S106, the determination unit 12 determines whether the main power supply voltage monitored by the monitoring unit 11 is lower than the second reference voltage $V_{ref2}$, thereby determining whether the main power supply voltage is normal. The second reference voltage $V_{ref2}$ is set beforehand to be a value lower than the first reference voltage $V_{ref1}$, e.g., a value which is insufficiently low for the motor drive apparatus 1 to drive-control the motor 3. By way of example, when the main power supply voltage of the motor drive apparatus 1 (i.e., the AC voltage inputted to the motor drive apparatus 1) is three-phase AC 200 V, the second reference voltage $V_{ref2}$ is set to be 100 V. When it is determined by the determination unit 12 than the main power supply voltage is lower than the second reference voltage $V_{ref2}$, the main power supply voltage is abnormal, and therefore the process proceeds to step S104. In contrast, when it is determined by the determination unit 12 that the main power supply voltage is higher than the second reference voltage $V_{ref2}$, the main power supply voltage is normal, and therefore the process proceeds to step S105.

At step S104, the magnetic contactor control unit 13 maintains the output of the open command (off command) that controls such that the contacts of the magnetic contactor 4 are opened (off). In this manner, the contacts of the magnetic contactor 4 are not allowed to be closed (on), so that the magnetic contactor 4 maintains the opened state (off state), and the main power supply voltage is prevented from being applied from the AC power supply 2 to the motor drive apparatus 1.

At step S105, the magnetic contactor control unit 13 outputs the close command (on command) that controls such that the contacts of the magnetic contactor 4 are closed (on). In this manner, the contacts of the magnetic contactor 4 are closed, so that the magnetic contactor 4 transits to the closed state (on state), and the main power supply voltage is prevented from being applied from the AC power supply 2 to the motor drive apparatus 1.

Figure 4:
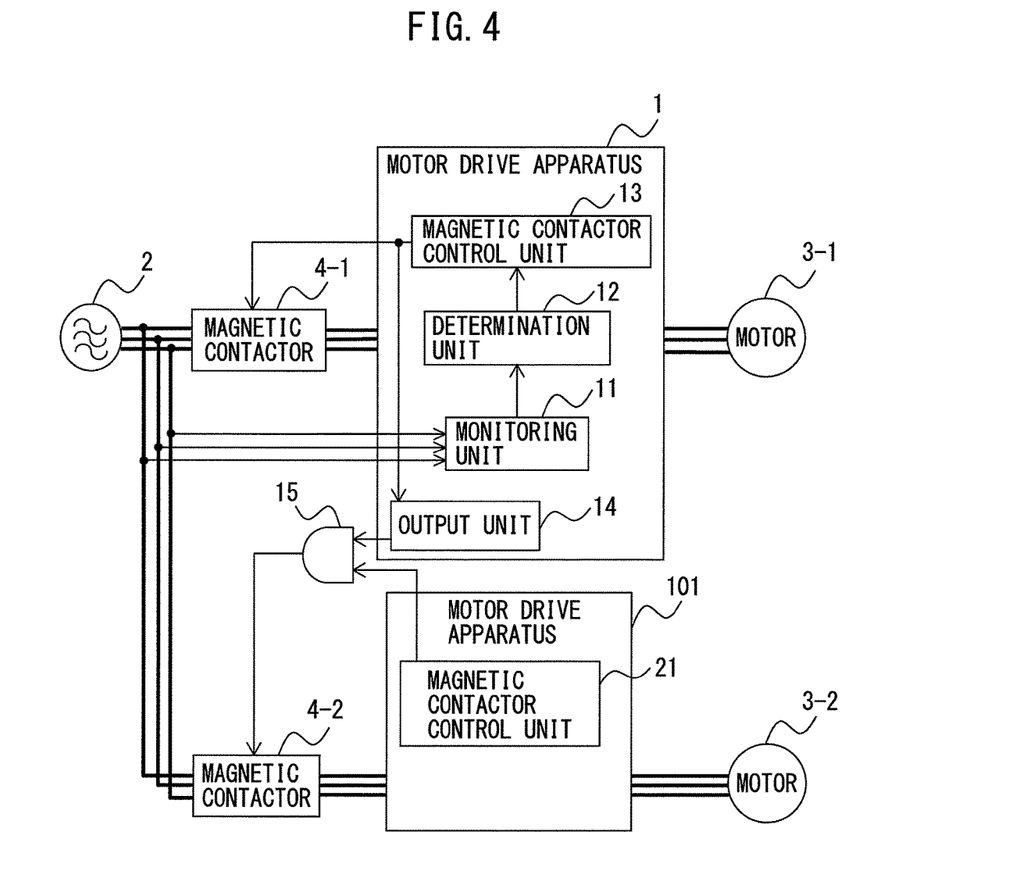
FIG. 4 is a block diagram illustrating an example in which the present invention is applied to a case of controlling a plurality of motor drive apparatuses.

While, in the above-described description and the modified example thereof, description has been made of the case of controlling the single motor drive apparatus, the present invention is also applicable in a case in which there are a plurality of the motor drive apparatuses. FIG. 4 is a block diagram illustrating an example in which the present invention is applied in a case of controlling a plurality of motor drive apparatuses. In the illustrated example, description will be made, by way of example, of a case of driving a motor 3-1 using the motor drive apparatus 1 and driving a motor 3-2 using a motor drive apparatus 101. Incidentally, the type of the motor 3-1 and the motor 3-2 does not limit the present invention, and may be an AC motor such as induction motor or synchronous motor or a DC motor. Further, the motor drive apparatus 1 and the motor drive apparatus 101 are both supplied with main power supply from the AC power supply 2. A magnetic contactor 4-1 is connected between the motor drive apparatus 1 and the AC power supply 2, and between a magnetic contactor 4-2 is connected between the motor drive apparatus 101 and the AC power supply 2. Incidentally, the type and structure of the magnetic contactors 4-1 and 4-2 do not particularly limit the present invention.

In the illustrated example, the motor 3-1 is drive-controlled by the motor drive apparatus 1 including a monitoring unit 11, a determination unit 12, and a magnetic contactor control unit 13. In contrast, the motor 3-2 is drive-controlled by the general motor drive apparatus 101 including a magnetic contactor control unit 21. The magnetic contactor control unit 21 provided in the motor drive apparatus 101 outputs, as a command that controls opening/closing (on/off) of contacts of the magnetic contactor 4-2, an open command (off command) that commands the contacts of the magnetic contactor 4-2 to be opened and a close command (on command) that commands the contacts of the magnetic contactor 4-2 to be closed. In this regard, the open/close command outputted from the magnetic contactor control unit 21 serves for the opening and closing operation of the magnetic contactor 4-2 in combination with the open/close command outputted from the magnetic contactor control unit 13 in the motor drive apparatus 1. In other words, according to the present embodiment, when it is determined by the determination unit 12 in the motor drive apparatus 1 that the main power supply voltage is abnormal, the magnetic contactor control unit 13 controls to maintain the opened state of the contacts of the magnetic contactor 4-1 connected to the motor drive apparatus 1 and further controls to maintain the opened state of the contacts of the magnetic contactor 4-2 connected to the other motor drive apparatus 101 different from the motor drive apparatus 1 including the magnetic contactor control unit 13.

In order to realize such controls, in the present embodiment, the motor drive apparatus 1 includes the monitoring unit 11, the determination unit 12, and the magnetic contactor control unit 13, and additionally includes an output unit 14 that outputs the open command and the close command outputted from the magnetic contactor control unit 13 to the magnetic contactor connected to the motor drive apparatus. Further, there is provided an AND gate (logical product circuit) 15 to which are inputted a command outputted from the output unit 14 in the motor drive apparatus 1 and a command outputted from the magnetic contactor control unit 21 in the motor drive apparatus 101, and a logical product of these commands is calculated in the AND gate 15 to be used as an open/close command for the magnetic contactor 4-2. Incidentally, in the illustrated example, the AND gate 15 is provided externally of the motor drive apparatus 1, but it may be implemented to be included in the motor drive apparatus 1.

When the open command (off command) and the close command (on command) outputted respectively from the output unit 14 and the magnetic contactor control unit 21 are represented by "L (low)" and "H (high)", respectively, it is when both the commands outputted from the magnetic contactor control unit 13 and the magnetic contactor control unit 21 are "H (close command)" that the output from the AND gate 15 becomes "H (close command)", and it is when at least one of the commands outputted from the magnetic contactor control unit 13 and the magnetic contactor control unit 21 is "L (open command)" that the output from the AND gate 15 becomes "L (open command)". As described above with reference to FIGS. 1 to 3, when it is determined by the determination unit 12 in the motor drive apparatus 1 that the main power supply voltage is abnormal, the magnetic contactor control unit 13 maintains the output of the open command (off command), so that the output from the AND gate 15 becomes the open command (off command). Therefore, when it is determined by the determination unit 12 in the motor drive apparatus 1 that the main power supply voltage is abnormal, the contacts of the magnetic contactor 4-1 and those of the magnetic contactor 4-2 are both not allowed to be closed (on), so that the magnetic contactor 4-1 and the magnetic contactor 4-2 maintain the opened state (off state), and thus the main power supply voltage is prevented from being applied from the AC power supply 2 to the motor drive apparatus 1 and the motor drive apparatus 101. The motor drive apparatus 1 and the motor drive apparatus 101 are both supplied with the main power supply from the AC power supply 2, and this means that should an inappropriate AC power supply 2 be erroneously connected to the motor drive apparatus 1 and the motor drive apparatus 101, both the motor drive apparatus 1 and the motor drive apparatus 101 could be influenced thereby. However, according to the present invention, by virtue of the abnormality determination process by the determination unit 12 and the opening and closing control by the magnetic contactor control unit 13 in the motor drive apparatus 1, it is possible to control the opening and closing operation for not only the magnetic contactor 4-1 connected to the motor drive apparatus 1 but also the magnetic contactor 4-2 connected to the motor drive apparatus 101.

Since other circuit components are similar to the circuit components illustrated in FIG. 1, identical circuit components are assigned identical reference numerals, and a detailed description of such circuit components is omitted.

Incidentally, in FIG. 4, the number of the motors is two, but any other plurality (three or more) is equally applicable. Although there is a case in which a plurality of motor drive apparatuses should be provided to drive-control a plurality of motors, it is possible to prevent a damage to the components of each motor drive apparatus and/or the motor per se by configuring, for at least one motor drive apparatus, the motor drive apparatus 1 including the monitoring unit 11, the determination unit 12, the magnetic contactor control unit 13, and the output unit 14 described above, inputting to the AND gate 15 the output from the output unit 14 and the output from the magnetic contactor control unit in the other motor control unit, and controlling the opening and closing operation of each magnetic contactor using the command outputted from the AND gate 15.

The monitoring unit 11, the determination unit 12, the magnetic contactor control unit 13, the output unit 14, and the AND gate 15 described above may, for example, be configured in a form of software program or in a combination of a various type of electronic circuit and software program. For example, when these are configured in a form of software program, it is possible to realize the function of each unit described above by allowing an arithmetic processing unit in a control device of the motor drive apparatus 1 to operate in accordance with the software program. Alternatively, the monitor unit 11, the determination unit 12, the magnetic contactor control unit 13, the output unit 14, and the AND gate 15 may be implemented as a semiconductor integrated circuit in which is written a software program for realizing the function of each unit.

According to the present invention, even when an inappropriate AC power supply is erroneously connected to the motor drive apparatus, the opened state (off state) of the magnetic contactor connected between the motor drive apparatus and the AC power supply is maintained, thereby making it possible to prevent a damage to the components of the motor drive apparatus and/or the motor per se. Further, also when a plurality of motor drive apparatuses are controlled, it is possible to prevent a damage to the components and/or the motor per se for all the motor drive apparatuses that control the respective motors merely by providing at least one motor drive apparatus according to the present invention.

What is claimed is:

1. A motor drive apparatus in which a main power supply used for motor drive is supplied via a magnetic contactor, the motor drive apparatus comprising:
    a monitoring unit electrically connected to no more than a single power supply,
    the single power supply consisting of a single three-phase AC power supply,
    the monitoring unit comprising three leads, each lead being coupled to a corresponding phase of the three-phase AC power supply on the AC power supply input side, each of the three leads being configured to measure the phase voltage of a corresponding phase of the three-phase AC power supply such that every phase of the three-phase AC power supply is monitored by the monitoring unit at the three-phase AC power supply of the magnetic contactor in a state in which contacts of the magnetic contactor are opened;
    a determination unit in electrical communication with the monitoring unit, the determination unit determining whether the main power supply voltage monitored by the monitoring unit is normal; and
    a magnetic contactor control unit in electrical communication with the determination unit and the contacts of the magnetic contactor, the magnetic contactor control unit outputting a command that controls opening and closing of the contacts of the magnetic contactor based on whether the main power supply voltage is abnormal as determined by the determination unit, wherein when it is determined by the determination unit that the main power supply voltage is abnormal, the magnetic contactor control unit maintains an output of an open command that controls such that the contacts of the magnetic contactor are opened.

2. The motor drive apparatus according to claim 1, wherein when the main power supply voltage is higher than a first reference voltage set beforehand, the determination unit determines that the main power supply voltage is abnormal.

3. The motor drive apparatus according to claim 2, wherein when the main power supply voltage is lower than a second reference voltage set beforehand at a value which is lower than the first reference voltage, the determination unit determines that the main power supply voltage is abnormal.

4. The motor drive apparatus according to claim 1, wherein when it is determined by the determination unit that the main power supply voltage is abnormal, the magnetic contactor control unit further maintains openings of contacts of a magnetic contactor connected to another motor drive apparatus which is different from the motor drive apparatus including the magnetic contactor control unit.

5. The motor drive apparatus according to claim 4, further comprising an output unit outputs the open command outputted from the magnetic contactor control unit to the magnetic contactor connected to the other motor drive apparatus,
    wherein the magnetic contactor connected to the other motor drive apparatus is configured such that the contacts thereof are opened when the open command is received from the output unit.

* * * * *